United States Patent
Linde et al.

(10) Patent No.: US 11,548,659 B2
(45) Date of Patent: Jan. 10, 2023

(54) METHOD FOR PRODUCING A FRAME COMPONENT FOR A DOOR FRAME STRUCTURE OF AN AIRCRAFT, FRAME COMPONENT, AND DOOR FRAME STRUCTURE

(71) Applicant: AIRBUS OPERATIONS GMBH, Hamburg (DE)

(72) Inventors: Peter Linde, Hamburg (DE); Albrecht Kluge, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 989 days.

(21) Appl. No.: 16/195,977

(22) Filed: Nov. 20, 2018

(65) Prior Publication Data
US 2019/0168891 A1 Jun. 6, 2019

(30) Foreign Application Priority Data
Nov. 24, 2017 (DE) ...................... 10 2017 221 048.6

(51) Int. Cl.
*B64F 5/10* (2017.01)
*B64C 1/14* (2006.01)
(Continued)

(52) U.S. Cl.
CPC ................ *B64F 5/10* (2017.01); *B23K 13/02* (2013.01); *B23K 20/10* (2013.01); *B23K 26/24* (2013.01);
(Continued)

(58) Field of Classification Search
CPC . B64F 5/10; B64C 1/14; B64C 1/1407; B64C 1/1461; B23K 13/02; B23K 20/10; B23K 26/24
See application file for complete search history.

(56) References Cited

U.S. PATENT DOCUMENTS 6,374,570 B1 * 4/2002 McKague, Jr. ... B29C 66/81455
52/762
8,523,110 B2 * 9/2013 Schwinning .......... B64C 1/1407
244/119
(Continued)

FOREIGN PATENT DOCUMENTS

CN       109835465 A     6/2019
EP         3488997 B1     9/2020
(Continued)

OTHER PUBLICATIONS

German Search Report for German Application No. 10 2017 221 048.6 dated Mar. 12, 2018.
(Continued)

*Primary Examiner* — Michael H Wang
(74) *Attorney, Agent, or Firm* — Jenkins, Wilson, Taylor & Hunt, P.A.

(57) ABSTRACT

A method for producing a frame component for a door frame structure of an aircraft. A connecting zone is generated on a first and a second assembly surface of a connecting component in each case by generating a surface texture on the assembly surfaces, wherein the connecting component is formed from a metal material. The assembly surfaces of the connecting component are placed against a door frame member and against an attachment member, wherein the door frame member and the attachment member are each formed from a fiber-reinforced thermoplastics material. Furthermore, the connecting component and the door frame member are welded, and the connecting component and the attachment member are welded. A frame component and a door frame structure are also described.

15 Claims, 4 Drawing Sheets

(51) Int. Cl.
  *B29C 65/00* (2006.01)
  *B29C 65/44* (2006.01)
  *B29C 65/16* (2006.01)
  *B23K 13/02* (2006.01)
  *B23K 20/10* (2006.01)
  *B23K 26/24* (2014.01)
  *B29L 31/30* (2006.01)
  *B29L 31/00* (2006.01)
  *B29C 65/08* (2006.01)
  *B29C 65/46* (2006.01)
  *B23K 101/24* (2006.01)

(52) U.S. Cl.
  CPC ............ *B29C 65/16* (2013.01); *B29C 65/44* (2013.01); *B29C 66/0246* (2013.01); *B29C 66/30322* (2013.01); *B29C 66/52441* (2013.01); *B29C 66/721* (2013.01); *B29C 66/7392* (2013.01); *B29C 66/742* (2013.01); *B29C 66/863* (2013.01); *B64C 1/1461* (2013.01); *B23K 2101/24* (2018.08); *B29C 65/08* (2013.01); *B29C 65/46* (2013.01); *B29C 66/71* (2013.01); *B29C 66/7212* (2013.01); *B29C 66/7422* (2013.01); *B29C 66/7428* (2013.01); *B29C 66/8652* (2013.01); *B29C 2791/009* (2013.01); *B29L 2031/3002* (2013.01); *B29L 2031/3076* (2013.01); *B29L 2031/724* (2013.01)

(56) References Cited

U.S. PATENT DOCUMENTS

| | | | |
|---|---|---|---|
| 9,067,670 | B2 | 6/2015 | Dugerie et al. |
| 2006/0096192 | A1* | 5/2006 | Daudet ............ E04C 3/07 52/204.1 |
| 2009/0146008 | A1* | 6/2009 | Thiele ............ B64C 1/1407 244/119 |
| 2009/0308977 | A1* | 12/2009 | Larcher ............ B64C 1/062 244/129.5 |
| 2012/0211602 | A1* | 8/2012 | Dugerie ............ B64C 1/1461 244/119 |
| 2014/0367521 | A1 | 12/2014 | Joern et al. |
| 2020/0172223 | A1* | 6/2020 | Smith ............ B33Y 80/00 |

FOREIGN PATENT DOCUMENTS

| | | |
|---|---|---|
| WO | WO 02/16784 A2 | 2/2002 |
| WO | WO 2017/101074 A1 | 6/2017 |
| WO | WO 2018/211232 A1 | 11/2018 |

OTHER PUBLICATIONS

Extended European Search Report for Application No. 18202656.7 dated Apr. 24, 2019.

* cited by examiner

METHOD FOR PRODUCING A FRAME COMPONENT FOR A DOOR FRAME STRUCTURE OF AN AIRCRAFT, FRAME COMPONENT, AND DOOR FRAME STRUCTURE

CROSS-REFERENCE TO RELATED APPLICATION

This application claims priority to German Patent Application 10 2017 221 048.6 filed Nov. 24, 2017, the entire disclosure of which is incorporated by reference herein.

TECHNICAL FIELD

The present disclosure relates to a method for producing a frame component for a door frame structure of an aircraft, to a frame component, and to a door frame structure.

BACKGROUND

In a fuselage of an aircraft, there are normally provided doors for passengers and on-board personnel and for the loading and unloading of the aircraft. Here, the doors are mounted in a frame which is connected to the fuselage structure or which forms a part of the fuselage structure. In a closed state of the door, the latter is locked to and/or supported against the frame. During flight, the pressure in the interior of the fuselage is generally considerably higher than the ambient pressure. The forces that act on the doors because of the pressure difference must be accommodated by the frame.

Conventional frame constructions have in each case two mutually oppositely situated members which are fastened by attachment struts to ribs or other structural components of the fuselage structure. The members and the attachment struts may in this case be formed from a fiber composite material for weight reasons. Normally, metal angle pieces are provided in each case for the fastening of the attachment struts to the members and to the fuselage structure, which metal angle pieces are screwed or riveted to the attachment struts and to the member or the fuselage structure. To reduce weight and to simplify the assembly of the frame, US 2009/0146008 A1 describes a frame with a member composed of titanium, in the case of which the attachment struts are formed in one piece with the member or are formed integrally thereon.

SUMMARY

It is an object of the disclosure herein to provide a frame concept, which is improved in particular with regard to weight and assemblability, for a door of an aircraft.

The object is achieved in each case by the subject matter disclosed herein. Advantageous embodiments and refinements are disclosed herein.

According to a first aspect of the disclosure herein, a method for producing a frame component for a door frame structure of an aircraft is provided. According to the method, a first connecting zone is formed on a first assembly surface of a connecting component by generating a surface texture of the assembly surface, that is to say by roughening the assembly surface, wherein the connecting component is formed from a metal material. For example, the connecting component may be an angle piece in the form of an L-shaped or T-shaped component with a first web and with at least one second web extending transversely with respect to the first web. In this step, it is thus the case that a surface topography which has elevations and depressions is generated on one surface of the connecting component. Incisions or cavities are formed in the assembly surface as a result of the roughening. A thickness of the connecting zone may be defined in particular by a maximum level difference that is measured between a base of a cavity and an elevation delimiting the cavity.

Furthermore, a second connecting zone is formed on a second assembly surface of the connecting component by generating a surface texture of the second assembly surface, wherein the second assembly surface extends transversely with respect to the first assembly surface. This step takes place analogously to the formation of the first connecting zone. The first assembly surface may for example be situated on the first web of the angle piece, and the second assembly surface on the second web of the angle piece. In general, the second assembly surface extends transversely with respect to the first assembly surface.

In a further step, the first assembly surface of the connecting component is placed against a door frame member. The door frame member is formed from a fiber-reinforced thermoplastics material. In general, the door frame member is formed from a fiber composite material which has a multiplicity of reinforcement fibers, in particular reinforcement fibers in the form of filaments or filament pieces, for example carbon, glass, ceramic, aramid, boron, mineral, natural or plastics fibers or mixtures of these, wherein the reinforcement fibers are embedded into a thermoplastics resin or matrix material. The door frame member may be provided in particular for forming, in the door frame structure of an aircraft, a lateral delimitation of a door opening in a fuselage structure of an aircraft. In this step, the connecting component is placed in contact with the door frame member. This is realized with a certain contact pressure force of the connecting component and of the door frame member against one another. If the connecting component is, as stated by way of example above, formed as an angle piece, the first web of the angle piece is placed against the door frame member, such that the first assembly surface is in areal contact with a surface of the door frame member, preferably directly, that is to say without an optional intermediate layer. The second web thus projects from the door frame member.

Furthermore, the connecting component and the door frame member are welded, wherein thermoplastics material of the door frame member ingresses into the first connecting zone of the connecting component. In this step, thermoplastics material is, in the region of the surface against which the first assembly surface of the connecting component bears, changed into a plastically deformable state. In this molten state, thermoplastics matrix material of the door frame member ingresses into the cavities formed in the first assembly surface and solidifies there. The connecting component is thus fastened to the door frame member.

In a further step, an attachment member is placed against the second assembly surface of the connecting component, wherein the attachment member is formed from a fiber-reinforced thermoplastics material. In particular, the attachment member may be formed from the same fiber-reinforced thermoplastics material as the door frame member. The attachment member may be provided in particular for the mechanical coupling of the door frame member to a component of a fuselage structure of the aircraft, for example for the coupling to a rib. The attachment member, which may also be referred to as intercostal element, is, by one surface, placed against the second assembly surface of the connecting component, preferably placed in contact directly, that is to say without an optional intermediate element, with the assembly surface. The placement is performed with a certain contact pressure force of the connecting component and of the attachment member against one another.

Finally, the connecting component and the attachment member are welded, wherein thermoplastics material of the attachment member ingresses into the second connecting zone of the connecting component. The welding of the connecting component and of the attachment member is performed analogously to the welding of the door frame member and of the connecting component.

The steps of the method according to the disclosure herein may also be performed in a sequence other than that described above. In particular, the formation of the first and of the second connecting zone on the first and on the second assembly surface, respectively, of the connecting component may be performed first. Also, the formation of the first and of the second connecting zone on the first and on the second assembly surface, respectively, of the connecting component may be performed simultaneously.

The welding of the attachment member and of the door frame member, which are each formed from a fiber-reinforced thermoplastics material, to the connecting component formed from metal improves the capacity for automation of the assembly process. Furthermore, in this way, the number of mechanical connecting devices such as screws, bolts or rivets which are required for the assembly of a frame structure for a door of an aircraft can be reduced. This saves weight and at the same time shortens the assembly time. Since the welding of the assembly surfaces of the connecting component to the attachment member and to the door frame member results in an areal connection of these components, a more uniform distribution of the mechanical stresses is realized in relation to a rivet or screw connection. Stress concentrations can thus be reduced. The welded connection furthermore has advantages with regard to fatigue strength.

In one embodiment of the method, the formation of the first connecting zone and of the second connecting zone of the connecting component is performed in each case by melting of the metal material on the first and on the second assembly surface by a laser beam or by electrochemical roughening of the first and of the second assembly surface. Accordingly, provision may be made for the assembly surfaces of the connecting component to be roughened by being melted in a particular thickness range by a laser beam. During the subsequent re-solidification of the metal material, the surface texture or surface topography that forms the connecting zone is formed. Performing such laser processing offers the advantage that the laser device required for this purpose, by which the laser beam is generated, can also be utilized for the welding of the connecting component to the door frame member and to the attachment member, as will be described below. As an alternative to the laser processing, electrochemical processing of the assembly surfaces may also be performed. Here, it is for example possible for an electrolyte material to be applied to the assembly surfaces, and for material to be anodically removed from the respective assembly surface, that is to say the assembly surface forms the anode in an electrochemical cell.

In a further embodiment, provision is made for the welding of the connecting component to the door frame member and to the attachment member to be performed in each case by laser welding, ultrasound welding or induction welding. In the case of all of the abovementioned welding methods, energy is introduced into thermoplastics matrix material of the door frame member and of the attachment member, and the material is thus melted. In the case of laser welding, this is performed by virtue of a laser beam being directed from the side of the connecting component or of the respective other joining partner—that is to say of the door frame member or of the attachment member—onto the contact region of the assembly surface of the connecting component and of the joining partner. Laser welding offers the advantage that the outlay in terms of apparatus for the process can be kept low overall, because the same laser device can be used for the welding and for the formation of the connecting zones of the connecting component. Furthermore, laser welding is advantageous in the region of regions which are spatially poorly accessible, such as for example in the case of an angled connecting component. The introduction of energy into thermoplastics material may also be realized by ultrasound welding, wherein a sonotrode introduces vibrations into the joining partners and melting of thermoplastics material occurs as a result of friction. In the case of induction welding, a metal mesh arranged between the respective joining partner and the assembly surface of the connecting component is heated by electrical voltage, and thermoplastics material is thus melted.

In a further embodiment of the method, the first and the second connecting zone of the connecting component are each formed with a surface topography which has level differences of between 1 μm and 8 μm. Accordingly, the connecting zone has a thickness of between 1 μm and 8 μm. In particular, incisions or cavities which have a depth of between 1 μm and 8 μm are formed in the surface as a result of the roughening. The depth of the cavities limits the maximum depth to which thermoplastics material ingresses into the respective assembly surface. The depth may optionally lie between 2 μm and 6 μm, preferably between 3 μm and 5 μm. In the latter range in particular, a high level of mechanical strength of the welded connection between the connecting component and the door frame member or the attachment member is advantageously realized.

In a further embodiment, in the method, a third connecting zone is additionally formed on a third assembly surface of the connecting component by generating a surface texture of the third assembly surface, wherein the third assembly surface is arranged opposite the second assembly surface and is oriented so as to face the latter, such that the second and the third assembly surface form a receiving space. In this embodiment, the connecting component has a further connecting surface. For example, for this purpose, the connecting component may have a further, third web, which extends parallel to the second web and which has the third assembly surface on a side facing toward the second web. The second web has the second assembly surface on the side facing toward the third web. The third connecting zone on the third assembly surface may be formed using one of the abovementioned methods and with the same thickness as the first or the second connecting zone.

In this embodiment, at the same time as the attachment member is placed against the second assembly surface of the connecting component, the attachment member is placed against the third assembly surface of the connecting component by virtue of the attachment member being slid into the receiving space. Here, the attachment member is thus slid in between the second and the third web of the connecting component. The second and the third assembly surface may in this case be arranged in particular with such a spacing that an interference fit with respect to the attachment member is realized. This offers the advantage that a contact pressure force required for the welding is generated between the attachment member and the connecting component without additional clamping devices or the like.

Subsequently, the connecting component and the attachment member are welded both at the second and at the third assembly surface of the connecting component, wherein thermoplastics material of the attachment member ingresses into the second and the third connecting zone of the connecting component, as has already been described.

According to further embodiment, the first assembly surface of the connecting component is placed against an abutment region of a surface of the door frame member and the second assembly surface of the connecting component is placed against an abutment region of a surface of the attachment member, wherein the door frame member and the attachment member are, in the abutment region, composed of or comprising thermoplastics material in a thickness range of between 1 µm and 8 µm from the surface. Accordingly, in the attachment member and in the door frame member, in each case at least in regions of the surface, no reinforcement fibers are arranged in a particular cross-sectional region below the surface. In the present embodiment, the connecting component with the respective assembly surface is arranged in such a region. Since, in the abutment region, the reinforcement fibers are arranged with a predetermined spacing to the surface, specifically with a spacing in a range between 1 µm and 8 µm, dislocation of the fibers during the welding process is reliably prevented. Furthermore, a type of material reserve is provided which is available for the ingress into the respective connecting region of the connecting component. The thickness range in which the attachment member or the door frame member is composed in each case of thermoplastics material may in particular also lie between 2 µm and 6 µm, preferably between 3 µm and 5 µm.

In a further embodiment of the method, provision is made for the door frame member to have a U-shaped cross section formed by a transverse web and two side webs, and wherein the first assembly surface of the connecting component is placed against an inner surface, which extends between the side webs, of the longitudinal web of the door frame member. Irrespective of the present embodiment, the door frame member is formed as an elongate component which has for example a linear, an arcuate or generally a curved longitudinal extent. In the present embodiment, the member has a U-shaped or C-shaped cross section. The cross section is formed here by a transverse web, on the opposite ends of which there is arranged in each case one side web, which side webs each extend transversely with respect to the transverse web. An inner surface of the door frame member extends between the transverse webs, against which inner surface the first assembly surface of the connecting component is placed.

Here, provision may optionally be made for the connecting component to be placed with the first assembly surface against the inner surface of the longitudinal web of the door frame member such that the second assembly surface of the connecting component extends transversely with respect to the side webs of the door frame member. If the connecting component is formed as an angle piece, the connecting component is thus arranged on the inner surface of the longitudinal web such that the second web of the connecting component and possibly the optional third web of the connecting component each extend between the side webs of the door frame member.

In a further embodiment of the method, provision may be made for the fiber-reinforced thermoplastics material of the door frame member and/or of the attachment member to have polyether ether ketone, abbreviated to PEEK, polyphenylene sulphide, abbreviated to PPS, polyethyleneimine, abbreviated to PEI, or a similar thermoplastics material as matrix material.

According to a further embodiment, titanium, a titanium alloy, aluminum, an aluminum alloy or a similar metal material is used as metal material for the connecting component.

According to a further aspect of the disclosure herein, a frame component for a door frame structure of an aircraft is provided. The frame component according to the disclosure herein has a door frame member composed of or comprising a fiber-reinforced thermoplastics material, a connecting component composed of or comprising a metal material, which is welded to an inner surface of the door frame member, and an attachment member composed of or comprising a fiber-reinforced thermoplastics material, which is welded to the connecting component.

According to this aspect of the disclosure herein, a frame component is provided which may be produced in particular by the above-described method. The technical relationships and advantages discussed on the basis of the method thus also apply analogously to the frame component according to the disclosure herein and vice versa.

The door frame member is formed as an elongate component which has for example a linear, an arcuate or generally a curved longitudinal extent. The door frame member may in particular be provided for forming, in the door frame structure of an aircraft, a lateral delimitation of a door opening in a fuselage of an aircraft. Here, the door may for example be mounted on the door frame member. Furthermore, on the door frame member, there may also be provided stop elements against which the door is supported in the closed state.

The attachment member, which may also be referred to as intercostal element, is likewise formed as an elongate component, which preferably has a linear longitudinal extent. The attachment member may be provided in particular for the mechanical coupling of the door frame member to a component of a fuselage structure of the aircraft, for example for the coupling to a rib or a further part of the frame component. The frame component preferably has multiple attachment members spaced apart from one another, which are each welded to a further connecting component and, via the latter, to the door frame member.

In particular, the door frame member and the attachment member are mechanically connected by the connecting component manufactured from metal, wherein thermoplastics matrix material of the door frame member and of the attachment member has, in the region of their surface against which a respective assembly surface of the connecting component bears, ingress into a connecting region of the assembly surfaces. Because of this welded connection, the number of mechanical connecting devices such as screws, bolts or rivets which are required for the assembly of a door frame structure for a door of an aircraft is reduced. This saves weight and at the same time shortens the assembly time. Furthermore, a more uniform distribution of the mechanical stresses is realized in relation to a rivet or screw connection. Stress concentrations can thus be reduced. The welded connection furthermore has advantages with regard to fatigue strength.

According to one embodiment of the frame component, the connecting component is formed as an L-shaped or T-shaped angle piece, wherein the connecting component is fastened by a first assembly surface to the door frame member and by a second assembly surface to the attachment member. Accordingly, the connecting component has a first web and at least one second web. It is optionally additionally possible for a third web to be provided. The first web has the first assembly surface. The second web is attached to a rear surface, situated opposite the first assembly surface, of the first web and extends transversely with respect to the first web. Furthermore, the second web has the second assembly surface. On the optional third web, there is provided a third assembly surface, wherein the third assembly surface is arranged opposite the second assembly surface and is oriented so as to face the latter, such that the second and the third assembly surface form a receiving space. Here, the third web extends parallel to the second web, and the third assembly surface is provided on a side facing toward the second web. The second web has the second assembly surface on the side facing toward the third web. If the second web and the optional third web are each arranged close to an edge of the first web, the result is an L-shaped cross section of the connecting component. If the second web and the optional third web are each arranged in a central region of the first web, the result is a T-shaped cross section of the connecting component.

In a further embodiment of the frame component, the door frame member has a U-shaped or C-shaped cross section formed by a transverse web and two side webs, and wherein the connecting component is fastened to an inner surface, which extends between the side webs, of the transverse web of the door frame member. The cross section of the door frame member is thus formed by a transverse web, on the opposite ends of which there is arranged in each case one side web, which side webs each extend transversely with respect to the transverse webs. Between the transverse webs, there extends an inner surface of the door frame member, to which the connecting component is welded by a first assembly surface.

In a further embodiment, the frame component additionally has a structure member composed of or comprising a fiber-reinforced thermoplastics material and a further connecting component composed of or comprising a metal material. The further connecting component is welded to an inner surface of the structure member and to an end section, situated opposite the door frame member, of the attachment member. The structure member is in particular formed as an elongate component which has for example a linear, an arcuate or generally a curved longitudinal extent. For example, the structure member may be formed as a segment of a rib of a fuselage structure. The attachment member thus extends between the door frame member and the structure member and is, at its end sections, welded in each case to a connecting element, which in turn is welded to the door frame member or to the structure member respectively. The further connecting element may be designed in the same way as the first connecting component, which is welded to the door frame member. The structure member increases the mechanical stability of the frame component.

In a further embodiment, the frame component additionally has a door stopper or a stop element. This is arranged on an outer surface situated opposite the inner surface of the door frame member, and has an abutment lug which projects from the outer surface. The stop element may in particular be formed as a metal element which is screwed to the door frame member. Optionally, the door stopper is, in relation to the longitudinal extent of the door frame member, arranged so as to at least partially, preferably fully, overlap the first assembly surface of the connecting component. In this way, a screw which fastens the door stopper can be provided so as to extend with its shank through the door frame member and through the connecting component. In this way, metallic abutment surfaces are advantageously provided in each case for the screw head and for a nut.

According to a further aspect of the disclosure herein, a door frame structure of an aircraft is provided. The door frame structure has a first frame component according to one of the embodiments described above and a second frame component according to one of the embodiments described above. Furthermore, the door frame structure has a first transverse strut, which extends between the door frame member of the first frame component and the door frame member of the second frame component and which is fastened in each case to a first end section of the door frame member of the first frame component and to a first end section of the door frame member of the second frame component. Furthermore, the door frame structure has a second transverse strut, which extends between the door frame member of the first frame component and the door frame member of the second frame component and which is fastened in each case to a second end section of the door frame member of the first frame component and to a second end section of the door frame member of the second frame component.

The door frame structure thus borders a door opening, wherein a door can be mounted pivotably on one of the door frame members of the frame components.

Here, a "fiber-reinforced thermoplastics material" is to be understood generally to mean a material which has a multiplicity of reinforcement fibers, in particular reinforcement fibers in the form of filaments or filament pieces, such as for example carbon, glass, ceramic, aramid, boron, mineral, natural or plastics fibers or mixtures of these, wherein the reinforcement fibers are embedded into a thermoplastics resin or matrix material, such as for example polyether ether ketone, abbreviated to PEEK, polyphenylene sulphide, abbreviated to PPS, polyethyleneimine, abbreviated to PEI, or a similar thermoplastics material.

With regard to directional specifications and axes, in particular directional specifications and axes relating to the profile of physical structures, a profile of an axis, of a direction or of a structure "along" another axis, direction or structure is to be understood to mean that these, in particular the tangents that arise at a respective point of the structures, run in each case at an angle of less than or equal to 45 degrees, preferably less than 30 degrees, and particularly preferably parallel, with respect to one another.

With regard to directional specifications and axes, in particular directional specifications and axes relating to the profile of physical structures, a profile of an axis, of a direction or of a structure "transversely" with respect to another axis, direction or structure is to be understood to mean that these, in particular the tangents that arise at a respective point of the structures, run in each case at an angle of greater than or equal to 45 degrees, preferably greater than or equal to 60 degrees, and particularly preferably perpendicular, with respect to one another.

BRIEF DESCRIPTION OF THE DRAWINGS

The disclosure herein will be discussed below with reference to the figures of the example drawings. In the figures.

In the figures, the same reference designations are used to denote identical or functionally identical components, unless stated otherwise.

DETAILED DESCRIPTION

Figure 1:
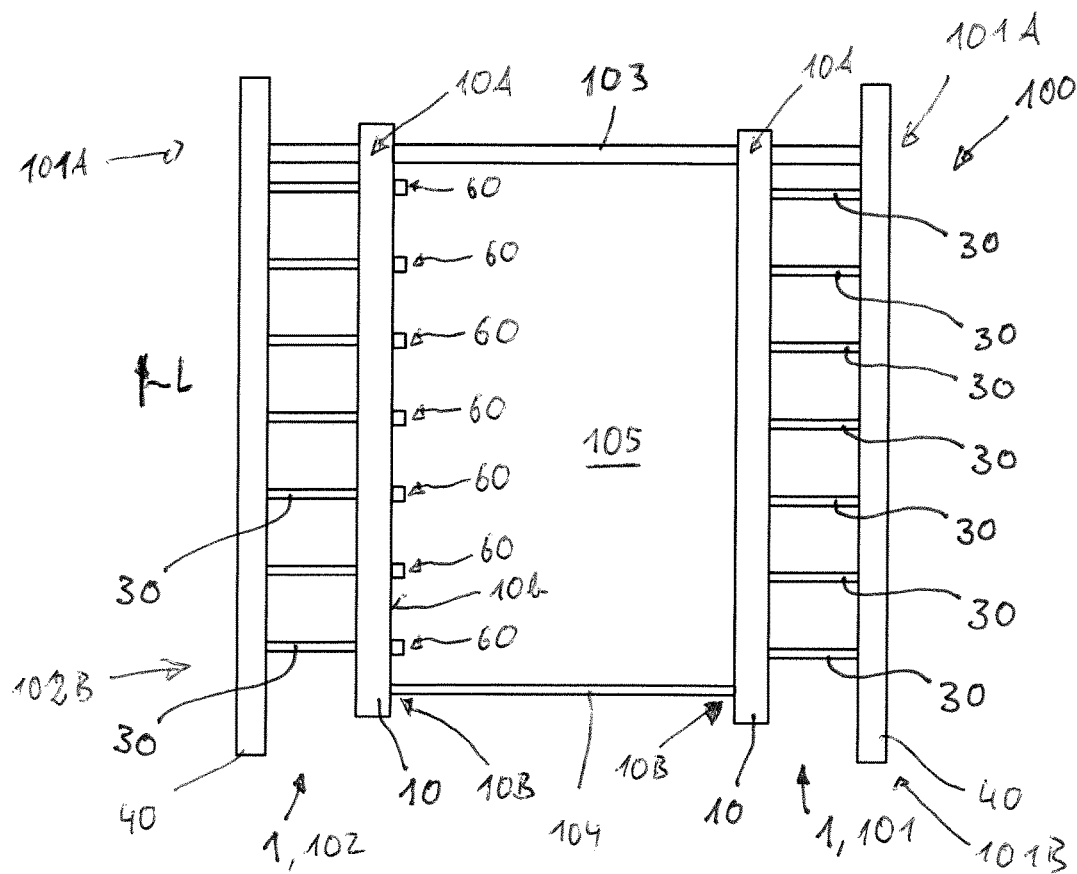
FIG. 1 shows a schematic view of a door frame structure of an aircraft according to an exemplary embodiment of the disclosure herein in a plan view.

FIG. 1 shows, by way of example, a door frame structure 100 of an aircraft. The door frame structure 100 has a first frame component 1, 101, a second frame component 1, 102, a first transverse strut 103, and a second transverse strut 104. The first and the second frame component 101, 102 are arranged so as to be spaced apart from one another. The transverse struts 103, 104 extend in each case transversely with respect to the frame components 101, 102, or run between these. The first transverse strut 103 is fastened to a first end region 101A of the first frame component 101 and to a first end region 102A of the second frame component 102. The second transverse strut 104 is fastened to a second end region 101B of the first frame component 101 and to a second end region 102B of the second frame component 102, wherein the second end regions 101B, 102B are, in relation to a longitudinal extent L of the frame components, situated opposite the first end regions 101A, 102A. As is schematically shown in FIG. 1, the frame components 101, 102 and the transverse struts 103, 104 together border or define a door opening 105, which can be closed by a door, which has not been illustrated.

Figure 2:
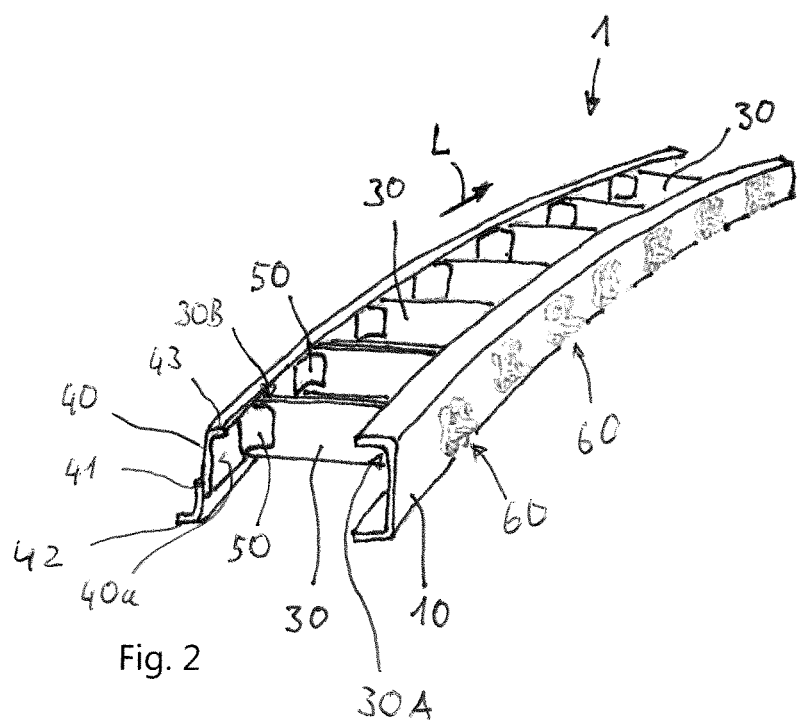
FIG. 2 shows a perspective view of a frame component for a door frame structure of an aircraft according to an exemplary embodiment of the disclosure herein.
Figure 3:
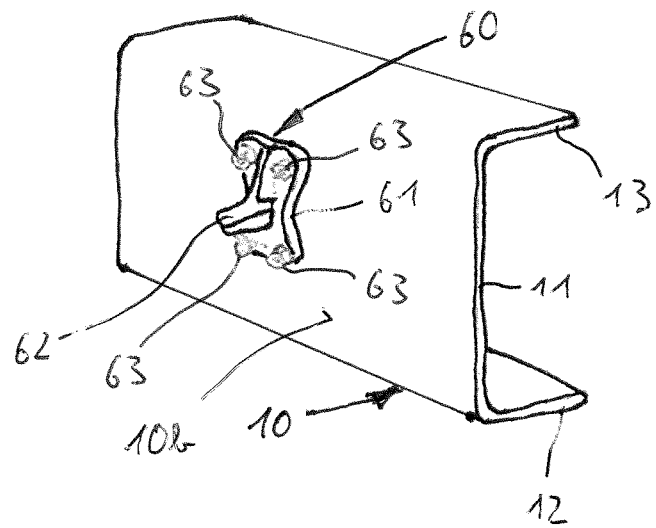
FIG. 3 shows a cut-away perspective view of a door frame member of the frame component shown in FIG. 2.

FIG. 2 shows a perspective view of one of the frame components 1 schematically shown in FIG. 1. FIG. 3 shows a cut-away perspective view of a door frame member 10 of the frame component 1 shown in FIG. 2, and FIG. 4 shows a further perspective view of the door frame member 10.

Figure 4:
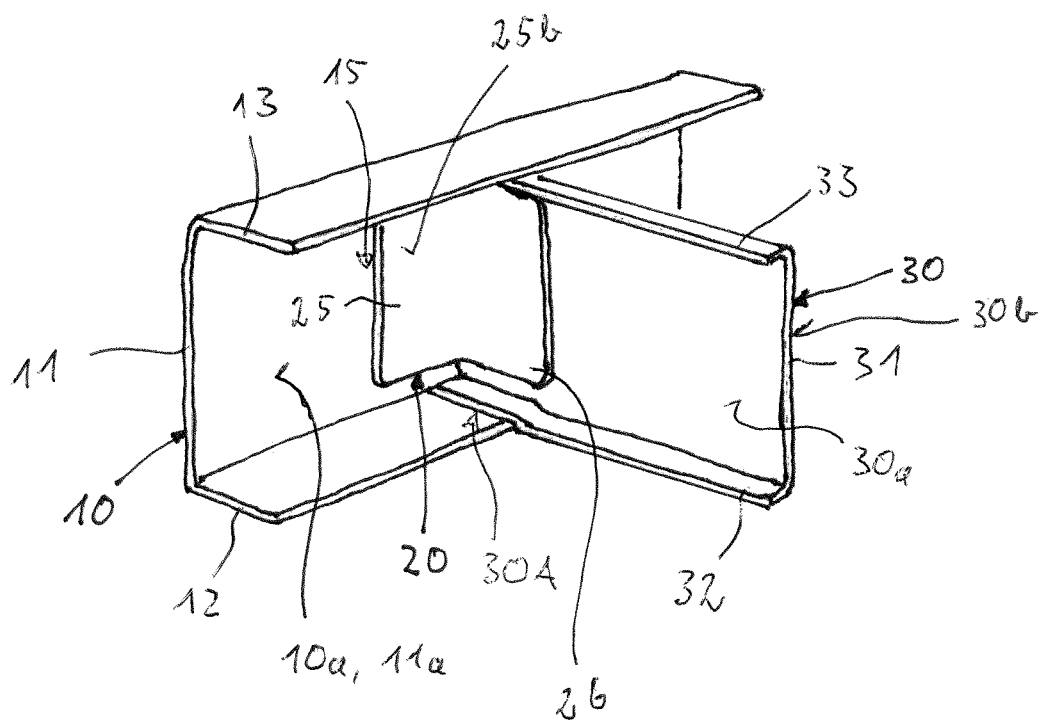
FIG. 4 shows a cut-away perspective view of a frame component according to a further exemplary embodiment of the disclosure herein.

As shown in FIGS. 2 to 4, the frame component 1 has a door frame member 10, a connecting component 20, an attachment member 30, an optional structure member 50, and an optional further connecting component 40. Furthermore, the frame component 1 has one or more door stoppers or stop elements 60. In the case of the frame component 1 shown by way of example in FIGS. 1 and 2, a total of seven attachment members 30 are provided.

As is shown by way of example in FIG. 2, the door frame member 10 is formed as an elongate component, which may have in particular an arcuate or generally a curved longitudinal extent. The door frame member 10 may be designed in particular as a profile member. The door frame member 10 shown by way of example in FIGS. 2 to 4 has a U-shaped or C-shaped cross section. Here, the cross section is formed by a transverse web 11, a first side web 12 and a second side web 13. The side webs 12, 13 extend in this case along one another, in particular parallel to one another, and are connected by the transverse web 11. The door frame member 10 is formed from a fiber-reinforced thermoplastics material, which has for example polyether ether ketone, abbreviated to PEEK, polyphenylene sulphide, abbreviated to PPS, polyethyleneimine, abbreviated to PEI, or a similar thermoplastics material as matrix material M. Into the matrix material M there are embedded reinforcement fibers F, such as for example carbon, glass, ceramic, aramid, boron, mineral, natural or plastics fibers or mixtures of these.

Figure 5:
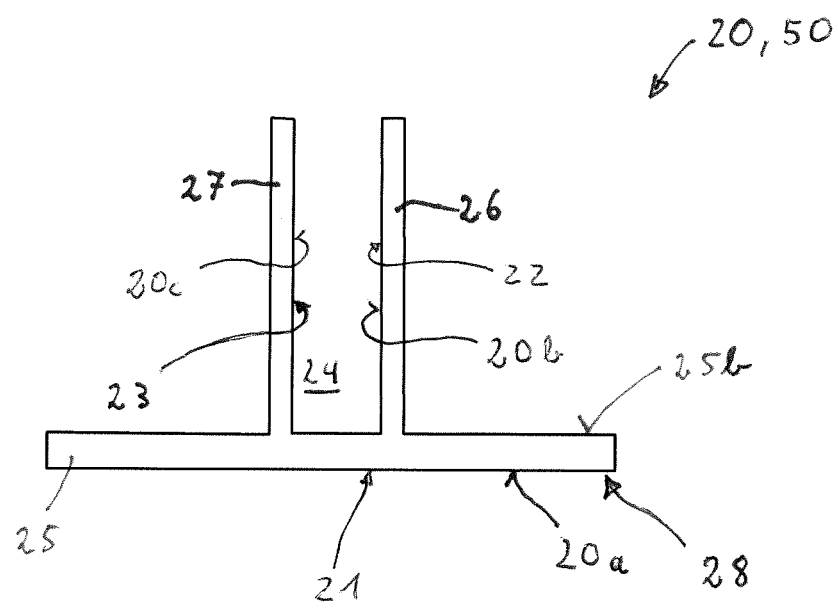
FIG. 5 shows a schematic sectional view of a connecting component of a frame component according to an exemplary embodiment of the disclosure herein.

FIG. 5 shows, by way of example, a sectional view of the connecting component 20, 50. The connecting component 20 generally has a first assembly surface 20a, a second assembly surface 20b and optionally a third assembly surface 20c. In general, the second assembly surface 20a extends transversely with respect to the first assembly surface 20b, whereby a corner or an angle is formed by the assembly surfaces 20a, 20b.

The connecting component 20 shown by way of example in FIG. 5 is formed as a T-shaped angle piece. The connecting component 20 has a first web 25, a second web 26 and an optional third web 27. The second and the third web 26, 27 extend transversely with respect to the first web 25 and are arranged spaced apart from one another in a central region of the first web 25 and are connected to the first web. The first assembly surface 20a is situated on the first web. The second and the third web 26, 27 are arranged on a rear surface 25b situated opposite the first assembly surface 20a and project from the rear surface. The second web 26 has the second assembly surface 20b, and the optional third web 27 has the third assembly surface 20c. As can be seen in FIG. 5, the second and the third assembly surface 20b, 20c are oriented so as to face toward one another and delimit or define a receiving space 24.

Instead of the T-shaped cross-sectional form shown by way of example in FIG. 5, the connecting component 20 may also have a L-shaped cross-sectional form (not illustrated). For this purpose, the second web 26 and the optional third web 27 are both arranged on one lateral end region 28 of the first web 25 (not illustrated).

The connecting component 20 is formed from a metal material such as for example titanium, a titanium alloy, aluminum, an aluminum alloy or a similar metal material.

As shown by way of example in FIGS. 1, 2 and 4, the attachment member 30 is, similarly to the door frame member 10, likewise formed as an elongate component, in particular in the form of a profile member. The attachment member 30 shown by way of example in FIGS. 1, 2 and 4 has a linear or straight longitudinal extent. It is however self-evidently also possible for the attachment member 30 to have a curved longitudinal extent (not shown). The attachment member 30 shown by way of example in FIGS. 2 and 4 has a U-shaped or C-shaped cross section. Here, the cross section is formed by a transverse web 31, a first side web 32 and a second side web 33. Here, the side webs 32, 33 extend along one another, in particular parallel to one another, and are connected by the transverse web 31. As shown by way of example in FIG. 4, the transverse web 31 may have a reduced width in a first end section 30A of the attachment member 30.

The attachment member 30 is formed from a fiber-reinforced thermoplastics material, which has for example polyether ether ketone, abbreviated to PEEK, polyphenylene sulphide, abbreviated to PPS, polyethyleneimine, abbreviated to PEI, or a similar thermoplastics material as matrix material M. Into the matrix material M there are embedded reinforcement fibers F, such as for example carbon, glass, ceramic, aramid, boron, mineral, natural or plastics fibers or mixtures of these.

As can be seen in FIG. 2, the structure member 40 is likewise formed as an elongate component, which optionally has an arcuate or generally a curved longitudinal extent. The structure member 40 may be designed in particular as a profile member. The structure member 40 shown by way of example in FIG. 2 has an approximately Z-shaped cross section, which is formed by a longitudinal web 41, a first side web 42, which projects from the longitudinal web 41 at a first end thereof transversely with respect to a first side, and a second side web 43, which projects from the longitudinal web 41 at a second end thereof transversely with respect to a second side. As shown by way of example in FIG. 2, provision may be made for the cross section of the structure member 40 to be assembled from two L-shaped profile segments, which overlap in the region of the longitudinal web 41.

The structure member 40 is formed from a fiber-reinforced thermoplastics material, which has for example polyether ether ketone, abbreviated to PEEK, polyphenylene sulphide, abbreviated to PPS, polyethyleneimine, abbreviated to PEI, or a similar thermoplastics material as matrix material M. Into the matrix material M there are embedded reinforcement fibers F, such as for example carbon, glass, ceramic, aramid, boron, mineral, natural or plastics fibers or mixtures of these.

As shown in particular in FIG. 3, the optional door stopper 60 generally has a abutment lug 62. The latter is provided as a support or abutment surface for a door (not shown) of an aircraft. As illustrated by way of example in FIG. 3, the door stopper 60 may have a base plate 61, from which the abutment lug 62 projects. The door stopper 60 is formed generally from a metal material, such as for example titanium, a titanium alloy, aluminum, an aluminum alloy or the like.

As shown in particular in FIG. 4, an inner surface 10*a* of the door frame member 10 and the connecting component 20 are fastened to one another, in particular welded to one another. Furthermore, the connecting component 20 and the attachment member 30 are fastened to one another, in particular welded to one another. In particular, here, the first assembly surface 20*a* of the connecting component 20 lies against the inner surface 10*a* of the door frame member 10. For example, the first assembly surface 20*a* may bear against, or be welded to, a part of the inner surface 10*a* of the door frame member 10, the part being formed by an inner surface 11*a*, extending between the side webs 12, 13, of the first web 11 of the door frame member 10. As is also shown in FIG. 4, the second assembly surface 20*b* provided on the second web 26 of the connecting component 20 lies against a first surface 30*a* of the attachment member 30, in particular against the transverse web 31 of the attachment member 30.

If, in FIG. 4, a connecting component 20 with an optional third web 27 is used, a second surface 30*b*, situated opposite the first surface 30*a*, of the attachment member 30 lies against the optional third assembly surface 30*c* of the connecting component 20.

As is also shown in FIG. 4, the connecting component 20 may in particular be positioned relative to the door frame member 10, or fastened with the first assembly surface 20*a* to the inner surface 11*a* of the longitudinal web 11 of the door frame member 10, such that the second assembly surface 20*b* of the connecting component extends transversely with respect to the side webs 12, 13 of the door frame member 10. In particular, provision may thus be made for the second web 26 and possibly the optional third web 26 to run along a direction extending from the first longitudinal web 12 in the direction of the second longitudinal web 13 of the door frame member. This offers the advantage in particular that the first end section 30A of the attachment member 30 can be slid in between the first and the second web 12, 13 of the door frame member 10.

As shown in FIGS. 1 and 2, the attachment member 30 extends between the door frame member 10 and the optional structure member 40. The structure member 40 and the door frame member 10 extend along one another, preferably parallel to one another. A second end section 30B of the attachment member 30, situated opposite the first end section 30A in relation to the longitudinal extent of the attachment member 30, is fastened, in particular welded, to a second assembly surface 20*b* of the further connecting component 50. The second end section 30B of the attachment member 30 is possibly also fastened, in particular welded, to an optional third assembly surface 20*c* of the further connecting component 50. The further connecting component 50 is of identical construction to the connecting component 20 described on the basis of FIG. 5. The first assembly surface 20*a* of the further connecting component 20 lies against the inner surface 40*a* of the structure member 40 and is fastened, in particular welded, thereto.

As is also shown in FIG. 2, the connecting component 50 may in particular be positioned relative to the structure member 40, or fastened with the assembly surface 20*a* to the inner surface 40*a* of the structure member 40, such that the second assembly surface 20*b* of the connecting component extends transversely with respect to the side webs 42, 43 of the structure member 40.

As shown by way of example in FIGS. 1 and 2, it is possible for multiple attachment members 30 to be provided, which are each connected in the above-described manner to the door frame member 10 and possibly to the optional structure member 40. As is also shown in FIGS. 1 and 2, the individual attachment members 30 are arranged spaced apart from one another along the longitudinal extent L of the door frame member 10. In this way, a mechanically robust, ladder-like structure of the frame component 1 is formed.

As can be seen in particular in FIG. 3, the door stopper 60 is arranged on an outer surface 10*b*, situated opposite the inner surface 10*a*, of the door frame member 10, wherein the abutment lug 62 projects in relation to the outer surface 10*b* of the door frame member 10. In particular, the door stopper 60 may be screwed to the door frame member 10, as is illustrated by way of example in FIG. 3. The door stopper 60 shown in FIG. 3 lies with its optional base plate 61 against the outer surface 10*b* of the door frame member 10 and has four recesses, through which there are lead screws 63 which extend through the door frame member 10, in particular through the transverse web 11 of the door frame member 10. Optionally, a door stopper 60 is arranged, in relation to the longitudinal extent of the door frame member 10, so as to overlap, in particular so as to fully overlap, the first assembly surface 20*a* of the connecting component 20. In this case, the screws 63 each also extend through the first web 25 of the connecting component 20.

A frame component 1 designed in the manner described above may be installed in particular to form a door frame structure 100, as shown by way of example in FIG. 1 and already briefly described in the introduction. The first transverse strut 103 extends between the door frame member 10 of the first frame component 1, 101 and the door frame member 10 of the second frame component 1, 102, wherein the first transverse strut 103 is fastened in each case to a first end section 10A of the door frame member 10 of the first frame component 1, 101 and to a first end section 10A of the door frame member 10 of the second frame component 1, 102. The second transverse strut 104 extends between the door frame member 10 of the first frame component 1, 101 and the door frame member 10 of the second frame component 1, 102, wherein the second transverse strut 104 is fastened in each case to a second end section 10b of the door frame member 10 of the first frame component 1, 101, the second end section being situated opposite the first end section 10A in relation to the longitudinal extent L of the door frame member 10, and to a second end section 10B of the door frame member 10 of the second frame component 1, 102, the second end section being situated opposite the first end section 10A in relation to the longitudinal extent L of the door frame member 10. As shown in FIG. 1, the door frame member 10 and the transverse struts 103, 104 together border the door opening 105 which, when the door frame structure 100 is installed in an aircraft (not shown), is provided for the loading and unloading of the aircraft or as a passenger entrance or passenger exit. The optional door stoppers 60 project in this case into the door opening 105.

A method for producing a frame component 1 for a door frame structure 100 for a door of an aircraft will be described below. In particular, the frame component 1 described above can be produced by this method. Reference is therefore made to the subjects shown in FIGS. 1 to 5.

In the method, a first connecting zone 21 is formed on the first assembly surface 20a of the connecting component 20 by generating a surface texture of the first assembly surface 20a. Furthermore, a second connecting zone 22 is formed on the second assembly surface 20b of the connecting component by generating a surface texture of the second assembly surface 20b, and it is possibly additionally the case that a third connecting zone 23 is formed on the third assembly surface 20c by generating a surface texture of the third assembly surface 20c.

Figure 6:
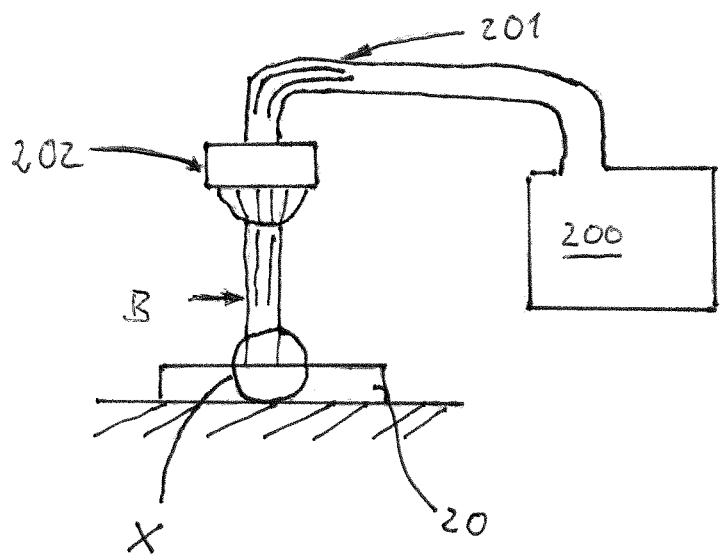
FIG. 6 shows a schematic view of the formation of a second connecting zone on a connecting component, which is performed as a step of a method according to an exemplary embodiment of the disclosure herein.

During the formation of the respective connecting zone 21, 22, 23, the respective assembly surface 20a, 20b, 20c of the metal material of the connecting component 20 is roughened, that is to say provided with a surface topography which has cavities or indentations and elevations. This step is illustrated by way of example and schematically in FIG. 6. By a laser source 200, a laser beam B is generated which is directed onto the respective assembly surface 20a, 20b, 20c by an optical waveguide 201, for example in the form of light-conducting fibers, by an optical device 202, which focuses and/or directs the laser beam B and/or filters certain wavelength ranges of the laser radiation. In this way, the metal material of the connecting component 20 is melted in the region of the respective assembly surface 20a, 20b, 20c. After this laser processing, the metal material solidifies again. In this way, a roughened surface forms. As an alternative to this laser processing, the respective connecting zone 21, 22, 23 may also be realized by electrochemical roughening of the respective assembly surface 20a, 20b, 20c.

Figure 7:
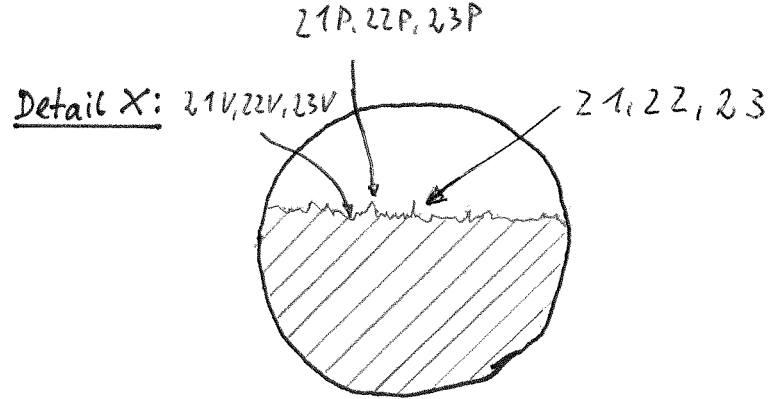
FIG. 7 shows a detail view of the region denoted by the alphabetic character X in FIG. 6.

FIG. 7 schematically shows a detail view of the connecting zone 21, 22, 23 of the connecting component. It can be seen that, as a result of the roughening, elevations 21P, 22P, 23P and depressions 21V, 22V, 23V have formed over an area. The first, the second and possibly the optional third connecting zone 21, 22, 23 of the connecting component 20 may in particular each be formed with a surface topography which has level differences d21, d22, d23 of between 1 μm and 8 μm. Accordingly, the respective connecting zone has a thickness of between 1 μm and 8 μm. In particular, as a result of the roughening, indentations or cavities 21V, 22V, 23V are formed in the respective assembly surface 20a, 20b, 20c which have a depth of between 1 μm and 8 μm. These level differences d21, d22, d23 can be seen in FIG. 10, to which reference will also be made in detail below.

Furthermore, the method comprises placing the first assembly surface 20a of the connecting component 20 against the door frame member 10, in particular against the inner surface 10a of the door frame member 10, preferably against the inner surface 11a of the transverse web 11 of the door frame member 10, as shown by way of example in FIG. 4 and already described in detail above.

Furthermore, the attachment member 30 is placed against the second assembly surface 20b of the connecting component 20, and in particular, the first surface 30a in the region of the first end section 30A of the attachment member 30 is placed against the second assembly surface 20b, as has been described in detail above. Optionally, the first end section 30A of the attachment member 30 is slid into the receiving space 24 of the connecting component 20, which is situated between the second and the optional third connecting surface 20a, 20b, 20c, as described above.

Provision may optionally be made for the first assembly surface 20a of the connecting component 20 to be placed against an abutment region 15 of the inner surface 10a of the door frame member 10, for the second assembly surface 20b of the connecting component 20 to be placed against an abutment region 35 of the first surface 30a of the attachment member 30, and possibly for the third assembly surface 20c of the connecting component 20 to be placed against an abutment region of the second surface 30b of the attachment member 30. In this respective abutment region 15, 35, the door frame member 10 and the attachment member 30 are formed, in the respective abutment region 15, 35 in the edge region of the cross section, exclusively from thermoplastics matrix material M, and so as to be free from reinforcement fibers F, as can be seen in particular in FIG. 10, as will be discussed in detail further below. In particular, the door frame member 10 and the attachment member 30 are, at least in the abutment region 15, 35, formed from thermoplastics matrix material M in a thickness range d15, d35 of between 1 μm and 8 μm from the respective surface 10a, 30a, 30b.

For the fastening of the door frame member 10 and of the attachment member 30 to the connecting component, the connecting component 20 and the door frame member 10 are welded, and the connecting component 20 and the attachment member 30 are welded. In each case, a hybrid welded connection is formed between the metal material of the connecting component 20 and thermoplastics matrix material M of the attachment member 30 and of the door frame member 10, respectively.

Figure 8:
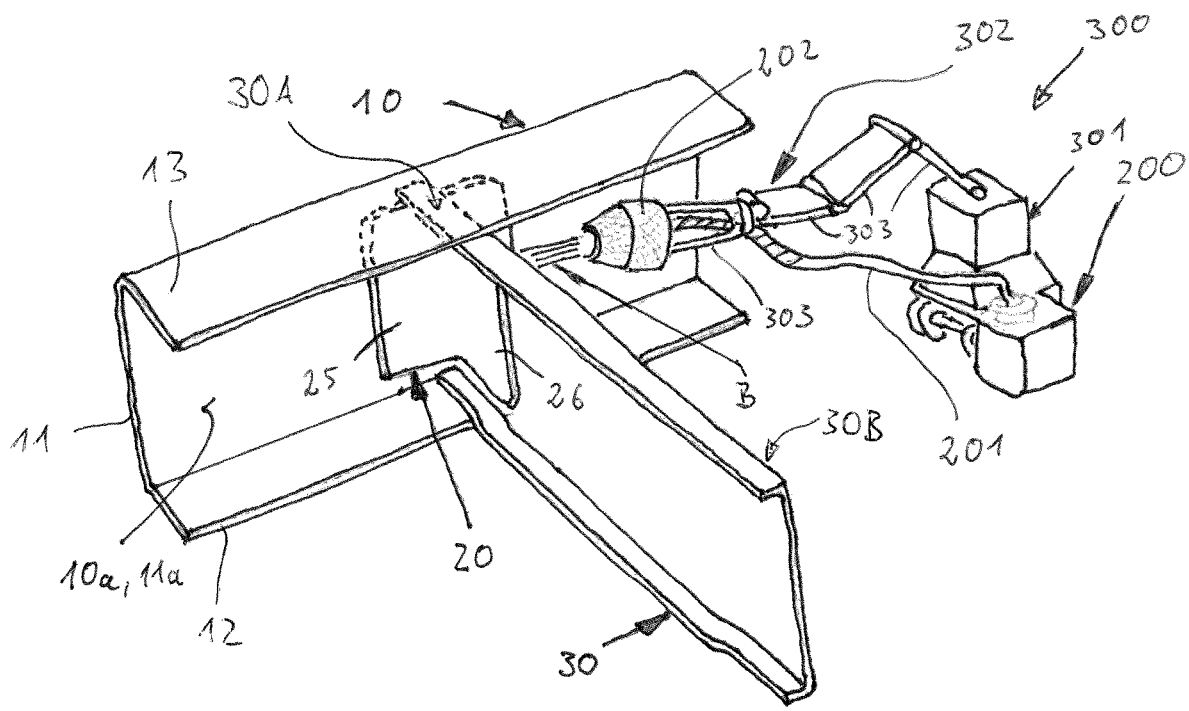
FIG. 8 shows a schematic view of the welding of a connecting component and of an attachment member, which is performed as a step of a method according to an exemplary embodiment of the disclosure herein.

The welding of the attachment member 30 to the connecting component 20 is schematically illustrated in FIG. 8. The welding of the door frame member 10 to the connecting component 20 is performed analogously. For the welding, the laser source 200 is used to generate a laser beam B, which, by the optical waveguide 201, and via the optical device 202, is directed onto the respective connecting zone 21, 22, 23 or onto the contact region between the attachment member 30 and the connecting component 20 or between the door frame member 10 and the connecting component 20.

This may be realized both by directing the laser beam B onto a web 25, 26, 27 of the connecting component 20 and by directing the laser beam B onto the door frame member 11 or the attachment member 30. As a result of the introduction of energy by the laser beam B, thermoplastics matrix material M of the attachment member 30 or of the door frame member 10, respectively, is changed into a plastically deformable state, in particular melted. As a result, thermoplastics matrix material M ingresses into the respective connecting zone 21, 22, 23 of the connecting component 20, and solidifies there.

FIG. 8 shows, by way of example and schematically, a welding robot 300 which has the laser source 200, the optical waveguide 201, the optical device 202, a chassis 301 and a manipulator 302. The chassis 301 may have multiple drive wheels, as shown in FIG. 8, and enables the welding robot 300 to be moved on the ground. The laser source 200 and the manipulator 302 are each connected to the chassis 301. The manipulator 302 has multiple movement arms 303 which are movable relative to one another, wherein the optical device 202 is arranged on a final movement arm 303. In this way, the laser beam B can be directed in an automated manner onto different locations, which facilitates the production of the frame component 1.

In general, the same laser source 200 can be used for forming the connecting zones 21, 22, 23 of the connecting component 20 and for the welding. The different required characteristics of the laser beam B can be generated by different optical devices 201.

As an alternative to the described laser welding, the welding of the connecting component 20 to the door frame member 10 and to the attachment member 30 may also be performed by ultrasound welding or induction welding. In general, it is necessary for the connecting zone 21, 22, 23 to be supplied with an amount of energy sufficient to melt thermoplastics matrix material.

Figure 9:
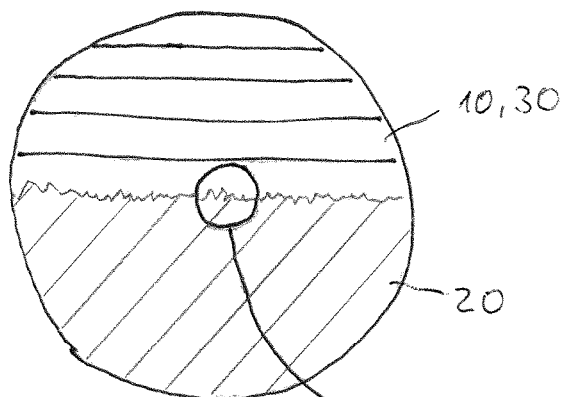
FIG. 9 shows a detail view of a welded connection between a connecting component composed of or comprising metal material and a door frame member or an attachment member composed of or comprising a fiber-reinforced thermoplastics material.
Figure 10:
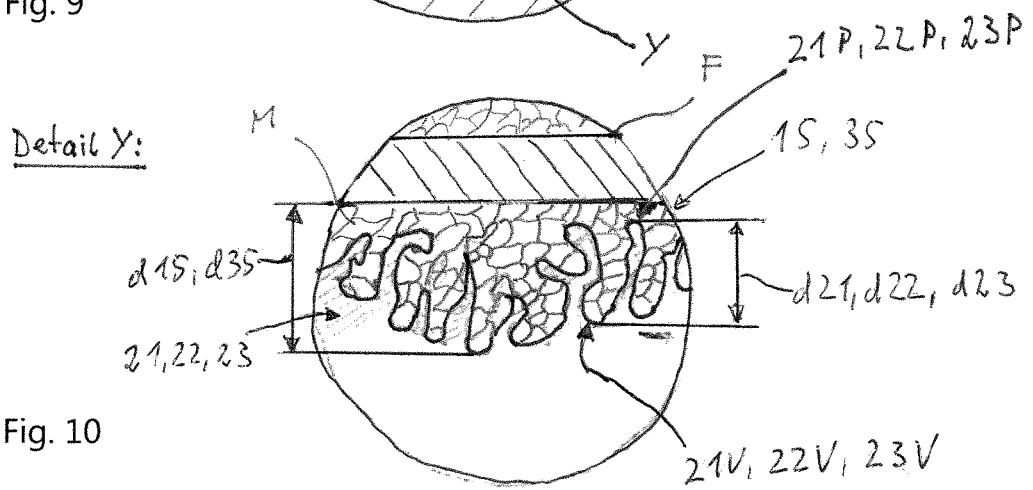
FIG. 10 shows a detail view of the region denoted by the alphabetic character Y in FIG. 9.

FIGS. 9 and 10 show, in each case in detail, a sectional view of a hybrid welded connection formed in this way between the attachment member 30 and the connecting component 20 or between the door frame member 10 and the connecting component 20, wherein FIG. 10 illustrates in detail the region denoted by the alphabetic character Y in FIG. 9. As can be seen in particular in FIG. 10, as a result of the melting of thermoplastics matrix material M in the region of the respective surface 10a, 30a, 30b, the matrix material M ingresses into the cavities 21V, 22V, 23V of the respective connecting zone 21, 22, 23 of the connecting component 20 and solidifies there. In this way, an at least partially positively locking connection is produced between the metal material of the connecting component 20 and thermoplastics material of the door frame member 10 or of the attachment member 30 respectively. The cavities 21V, 22V, 23V have, in part, undercuts, and/or extend in each case in different directions. This additionally increases the mechanical load-bearing capacity of the welded connection.

As can also be seen in FIG. 10, thermoplastics matrix material M may be melted in particular in a thickness range d15, d35 of between 1 µm and 8 µm. As shown in FIG. 10, no reinforcement fibers F are present in this thickness range. In this way, damage to, deformation of and dislocation of the reinforcement fibers F as a result of the welding process are prevented.

FIG. 10 also shows that the level differences d21, d22, d23 of the surface texture of the respective assembly surface 20a, 20b, 20c of the connecting component 20 may optionally likewise amount to between 1 µm and 8 µm. In particular, provision may be made for the level differences d21, d22, d23 of the surface texture of the respective assembly surface 20a, 20b, 20c of the connecting component 20 to lie in a range between 50 percent and 90 percent of the thickness range d15, d35 of the door frame member 10 or of the attachment member respectively.

Welding of the second end section 30B of the attachment member 30 and of the optional structure member 40 to the further connecting component 50 may be performed in the same way as described above for the first end section 30A of the attachment member 30 and the door frame member 50 to the connecting component 20.

Although the disclosure herein has been discussed by way of example above on the basis of exemplary embodiments, it is not restricted to these, but rather may be modified in a wide variety of ways. In particular, combinations of the above exemplary embodiments are also conceivable.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE DESIGNATIONS

1 Frame component
10 Door frame member
10a Inner surface of the door frame member
10b Outer surface of the door frame member
10A First end section of the door frame member
10B Second end section of the door frame member
11 Transverse web of the door frame member
11a Inner surface of the transverse web
12 First side web of the door frame member
13 Second side web of the door frame member
15 Abutment region
20, 50 Connecting component
20a First assembly surface of the connecting component
20b Second assembly surface of the connecting component
20c Third assembly surface of the connecting component
21 First connecting zone
22 Second connecting zone
23 Third connecting zone
21P-23P Elevation
21V-23V Cavities
24 Receiving space
25 First web of the connecting component
25b Rear surface of the first web
26 Second web of the connecting component
27 Third web of the connecting component
28 Lateral end region of the first web
30 Attachment member
30a First surface of the attachment member
30A First end section of the attachment member
30B Second end section of the attachment member
30b Second surface of the attachment member 31 Transverse web of the attachment member
32 First side web of the attachment member
33 Second side web of the attachment member
35 Abutment region of the attachment member
40 Structure member
40a Inner surface of the structure member
41 Longitudinal web of the structure member
42 First side web of the structure member
43 Second side web of the structure member
60 Door stopper
62 Abutment lug
100 Door frame structure
101 First frame component
101A First end region of the first frame component
101B Second end region of the first frame component
102 Second frame component
102A First end region of the second frame component
102B Second end region of the second frame component
103 First transverse strut
104 Second transverse strut
105 Door opening
200 Laser source
201 Optical waveguide
202 Optical device
300 Welding robot
301 Chassis
302 Manipulator
303 Movement arms
B Laser beam
L Longitudinal direction
M Matrix material
F Reinforcement fibers
X, Y Region
d15 Thickness range of the door frame member
d35 Thickness range of the attachment member
d21-d23 Level differences in, in each case, the first, second and third connecting zone

The invention claimed is:

1. A method for producing a frame component that defines an opening of a door frame of an aircraft, the method comprising:
forming a first connecting zone on a first assembly surface of a connecting component by generating a surface texture of the first assembly surface, wherein the connecting component comprises a metal material;
forming a second connecting zone on a second assembly surface of the connecting component by generating a surface texture of the second assembly surface, wherein the second assembly surface extends transversely with respect to the first assembly surface;
placing the first assembly surface of the connecting component against a door frame member which comprises a fiber-reinforced thermoplastics material;
welding the connecting component and the door frame member, wherein thermoplastics material of the door frame member ingresses into the first connecting zone of the connecting component;
placing an attachment member against the second assembly surface of the connecting component, wherein the attachment member comprises a fiber-reinforced thermoplastics material; and
welding the connecting component and the attachment member together on an opposite side of the connecting component from where the door frame member and the connecting component are welded together, wherein thermoplastics material of the attachment member ingresses into the second connecting zone of the connecting component.

2. The method according to claim 1, wherein:
forming the first connecting zone of the connecting component comprises melting the metal material on the first assembly surface by a laser beam or by electrochemical roughening of the first assembly surface; and
forming the second connecting zone of the connecting component comprises melting the metal material on the second assembly surface by a laser beam or by electrochemical roughening of the second assembly surface.

3. The method according to claim 1, wherein:
welding the connecting component to the door frame member is performed by laser welding, ultrasound welding, or induction welding; and
welding the connecting component to the attachment member is performed by laser welding, ultrasound welding, or induction welding.

4. The method according to claim 1, wherein the first and the second connecting zone of the connecting component are each formed with a surface topography which has level differences of between 1 μm and 8 μm.

5. The method according to claim 1, comprising:
forming a third connecting zone on a third assembly surface of the connecting component by generating a surface texture of the third assembly surface, wherein the third assembly surface is arranged opposite the second assembly surface and is oriented so as to face the latter, such that the second and the third assembly surface form a receiving space;
at the same time as the attachment member is placed against the second assembly surface of the connecting component, placing the attachment member against the third assembly surface of the connecting component by sliding the attachment member into the receiving space; and
welding the connecting component and the attachment member both at the second and at the third assembly surface of the connecting component, wherein the thermoplastics material of the attachment member ingresses into the second and the third connecting zones of the connecting component.

6. The method according to claim 1, wherein the first assembly surface of the connecting component is placed against an abutment region of a surface of the door frame member and the second assembly surface of the connecting component is placed against an abutment region of a surface of the attachment member, wherein the thermoplastics material of the door frame member and the thermoplastics material of the attachment member have, in the respective abutment region, a thickness range of between 1 pm and 8 pm from the surface.

7. The method according to claim 1, wherein the door frame member has a U-shaped or C-shaped cross section formed by a transverse web and two side webs, and wherein the first assembly surface of the connecting component is placed against an inner surface, which extends between the side webs, of the transverse web of the door frame member.

8. The method according to claim 7, wherein the connecting component is placed with the first assembly surface against the inner surface of the transverse web of the door frame member such that the second assembly surface of the connecting component extends transversely with respect to the side webs of the door frame member.

9. The method according to claim 1, wherein the fiber-reinforced thermoplastics material has polyether ether ketone, polyphenylene sulphide, or polyethyleneimine as a matrix material.

10. A frame component that defines an opening of a door frame of an aircraft, the frame component comprising:
- a door frame member comprising a fiber-reinforced thermoplastics material;
- a connecting component comprising a metal material, which is welded to an inner surface of the door frame member; and
- an attachment member comprising a fiber-reinforced thermoplastics material, which is welded to the connecting component on an opposite side of the connecting component from where the door frame member and the connecting component are welded together.

11. The frame component according to claim 10, wherein the connecting component is formed as an L-shaped or T-shaped angle piece, and wherein the connecting component is fastened, by a first assembly surface, to the door frame member and, by a second assembly surface, to the attachment member.

12. The frame component according to claim 10, wherein the door frame member has a U-shaped or C-shaped cross section formed by a transverse web and two side webs, and wherein the connecting component is fastened to an inner surface, which extends between the side webs, of the transverse web of the door frame member.

13. The frame component according to claim 10, comprising:
- a structure member comprising a fiber-reinforced thermoplastics material; and
- a further connecting component comprising a metal material, wherein the further connecting component is welded to an inner surface of the structure member and to an end section, situated opposite the door frame member, of the attachment member.

14. The frame component according to claim 10, comprising a door stopper arranged on an outer surface, which is situated opposite the inner surface of the door frame member, wherein the door stopper comprises an abutment lug which projects from the outer surface.

15. A door frame of ctructurc for an aircraft, the door frame comprising:
- a first frame component comprising:
  - a first door frame member comprising a fiber-reinforced thermoplastics material;
  - a first connecting component comprising a metal material, which is welded to an inner surface of the first door frame member; and
  - a first attachment member comprising a fiber-reinforced thermoplastics material, which is welded to the first connecting component on an opposite side of the first connecting component from where the first door frame member and the first connecting component are welded together;
- a second frame component comprising:
  - a second door frame member comprising a fiber-reinforced thermoplastics material;
  - a second connecting component comprising a metal material, which is welded to an inner surface of the second door frame member; and
- a second attachment member comprising a fiber-reinforced thermoplastics material, which is welded to the second connecting component on an opposite side of the second connecting component from where the second door frame member and the second connecting component are welded together;
- a first transverse strut, which extends between the first door frame member and the second door frame member and is fastened, at opposite ends of the first transverse strut, to a first end section of the first door frame member and to a first end section of the second door frame member, respectively; and
- a second transverse strut, which extends between the first door frame member and the second door frame member and is fastened, at opposite ends of the second transverse strut, to a second end section of the first door frame member and to a second end section of the second door frame member, respectively.

* * * * *